Patented Aug. 7, 1923.

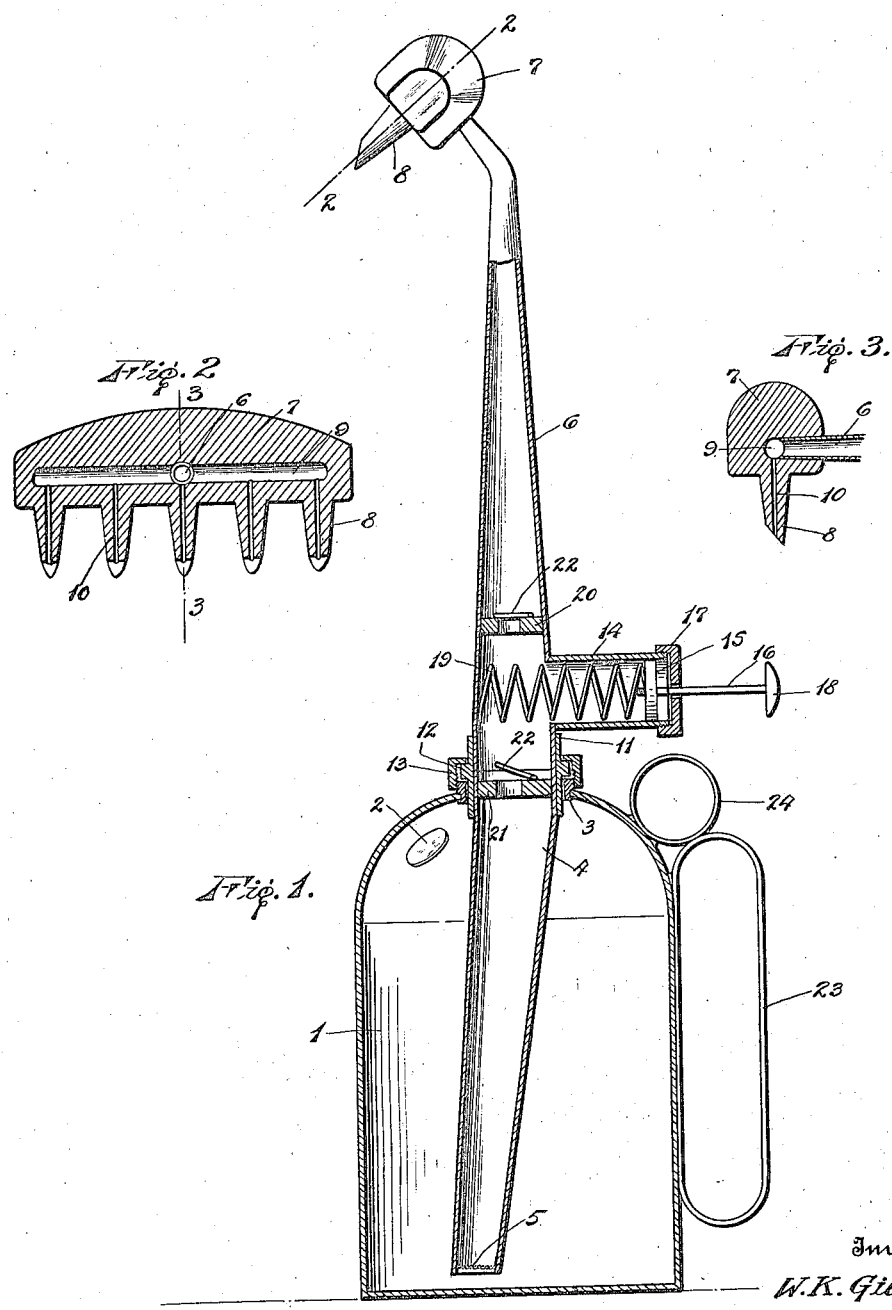

1,464,419

UNITED STATES PATENT OFFICE.

WALTER K. GILL, OF WALKER SPRINGS, ALABAMA.

LIQUID CONTAINER.

Application filed January 4, 1921. Serial No. 434,973.

*To all whom it may concern:*

Be it known that I, WALTER K. GILL, a citizen of the United States, residing at Walker Springs, in the county of Clarke and State of Alabama, have invented certain new and useful Improvements in Liquid Containers, of which the following is a specification.

The object of this invention is to provide a simple device by the use of which a medicament may be applied to the skin of an animal at the same time the animal is curried so that germs and vermin of all kinds may be destroyed without annoying the animal or frightening him so as to render treatment difficult. The invention also has for its object the provision of a device for the stated purpose of such construction that the flow of the medicament may be made positive and the entire supply utilized.

The stated objects and other objects which will incidentally appear hereinafter are attained in such a device as is illustrated in the accompanying drawings and the invention resides in certain novel features which will be particularly pointed out in the claims following the description.

In the drawings—

Figure 1 is a sectional elevation of a device embodying my invention.

Fig. 2 is a section on the line 2—2 of Fig. 1;

Fig. 3 is a section on the line 3—3 of Fig. 2.

In carrying out my invention, I employ a container 1 which is preferably a cylindrical body provided in one end with a filling opening 2 normally closed by a plug in a well-known manner. In the top or filling end of the container is a collar 3 and through the said collar is fitted a tube 4 of such length that it will extend close to the bottom of the container where its open end is provided with a screen 5 to prevent the passage of solid particles into the tube. The tubing extends beyond the nozzle and constitutes a delivery spout 6 to the discharge end of which is fitted a head 7 having teeth 8 depending from one side. The head is provided with an internal passage 9 into which the discharge end of the nozzle leads and ducts 10 extend from the said passage 9 through the several teeth 3, as clearly shown in Figs. 2 and 3. The tube 4 and nozzle or discharge spout 6 may be integral or they may be separate members placed end to end, but in either event they will be reinforced by a sleeve 11 which is adapted at one end to pass through the collar 3 and is provided externally with an annular rib or flange 12. A clamping ring 13 is fitted upon the outer end of the sleeve 11 and extends around the said rib or flange 12 to have threaded engagement with the collar 3 whereby the combined spout and tube will be swiveled in the top of the container. Adjacent the top of the container, a cylinder 14 is provided upon one side of the spout or nozzle and within the said cylinder is slidably mounted a piston 15 the piston rod 16 of which extends through a cap 17 secured upon the outer end of said cylinder. The outer end of the piston rod 16 is provided with a handle or thumb-piece 18 and a spring 19 is coiled within the cylinder and bears at its opposite ends against the piston 15 and the remote wall of the nozzle 6, as clearly shown in Fig. 1. At opposite sides of the said spring, diaphragms or partitions 20 and 21 are secured in the nozzle and tube and these partitions are each equipped with an outwardly opening valve 22. Upon the outer side of the container is a handle 23 and a finger ring 24 so that the container may be easily held by the operator with the forefinger passing through the ring 24 and the thumb bearing upon the thumb-piece 18.

The manner of using the device is thought to be clear but may be briefly summarized. A germicide or other medical compound is placed in the container through the filling opening 2 and the container is then held in such position that the teeth 3 of the currycomb will bear upon the animal in the usual manner. If the piston or plunger 15 be pressed inwardly against the force of the spring 19, while the teeth are held in contact with the animal's skin, the air which may be contained between the partitions 20 and 21 will be expelled through the outer valve 22 and escape through the teeth of the currycomb. Upon release of the piston, the spring 19 will at once return it to its initial position against the cap 17 and a partial vacuum will thus be created between the two partitions 20 and 21, whereupon liquid will be sucked through the screen 5 into the tube 4 and will flow past the inner valve 22 into the chamber defined by the partitions. If the piston be then again depressed this liquid will be forced through the outer partition and through the nozzle to escape through the currycomb teeth onto the skin of the animal and will, therefore, be applied positively and easily without disturbing the animal in any way. By providing the finger ring 24 as well as the handle 23 the container may be held without discomfort to the user and the thumb will be brought into such position that it may readily actuate the piston 15 without fatigue, the swiveled connection of the tube 4 and the nozzle 6 permitting a slight rotary movement of the said members so that the piston may conform to possible angular movement of the thumb. When it is desired to clean or repair the container or the other parts, the clamping ring 13 may be readily withdrawn whereupon the nozzle and tube may be lifted from the container as is obvious. It will be readily noted that the ducts 10 through the currycomb teeth are of exceedingly small diameter and consequently, the flow of the liquid onto the skin will be retarded so that it will not exert a noticeable impact and annoyance to a sensitive animal is thus avoided. Moreover, the expansion of the air trapped within the container when it is filled will serve to atomize the medicine to some extent so that it will be delivered onto the animal's skin in the nature of a spray and a small quantity of the medicine may be effectually applied to a considerable surface of the skin. The device is exceedingly simple in its construction and the arrangement of its parts and may be manufactured and supplied at a low cost.

Having thus described the invention, what is claimed as new is:

In a liquid container provided with an opening, a collar secured in said opening, a tube reaching from near the bottom of the container through and beyond said collar to form a spout at its outer extremity and tapering in both directions from said collar, a reinforcing sleeve on said tube provided with an annular flange adapted to engage with said collar, and a clamping member having threaded engagement with said collar and adapted to secure said sleeve and tube on said collar, a pumping device being arranged on said tube adapted to deliver liquid from said container to said spout.

In testimony whereof I affix my signature.

WALTER K. GILL. [L. S.]